United States Patent
Rokkjaer

[11] Patent Number: 5,901,747
[45] Date of Patent: May 11, 1999

[54] LIQUID TRANSFER SYSTEM WITH FLOW CONTROL

[75] Inventor: Henrik Rokkjaer, Northridge, Calif.

[73] Assignee: Micro Matic U.S.A., Inc., Northridge, Calif.

[21] Appl. No.: 09/102,502

[22] Filed: Jun. 22, 1998

[51] Int. Cl.[6] .............................. B67D 1/04; F16L 37/24; F16L 37/28
[52] U.S. Cl. ...................... 137/614.2; 137/212; 137/322; 137/614; 137/614.11; 137/854; 141/352; 222/400.7
[58] Field of Search ................................... 137/212, 322, 137/614, 614.11, 614.2, 854; 222/400.7; 251/149.6, 149.9; 141/59, 348, 351, 352, 65

[56] References Cited

U.S. PATENT DOCUMENTS

| 3,361,152 | 1/1968 | Akers | 137/212 |
|---|---|---|---|
| 3,403,696 | 10/1968 | Pynchon | 137/854 |
| 3,412,747 | 11/1968 | Sichler | 137/854 |
| 4,159,102 | 6/1979 | Fallon et al. | 137/322 |
| 4,180,189 | 12/1979 | Zurit et al. | 137/212 |
| 4,291,821 | 9/1981 | Nezworski | 222/400.7 |

FOREIGN PATENT DOCUMENTS

| 2639918 | 3/1978 | Germany | 222/400.7 |
|---|---|---|---|
| 1553680 | 10/1979 | United Kingdom | 222/400.7 |

*Primary Examiner*—George L. Walton
*Attorney, Agent, or Firm*—James E. Brunton

[57] ABSTRACT

A system for the filling, transport and emptying of liquid containers which include a novel coupler mechanism for interconnection with a coupler operated extractor valve provided on the liquid container. The coupler includes a novel coupler flow control assembly for preventing liquid trapped within the coupler body from leaking back into the container to which the coupler is connected. More particularly, the coupler includes a novel one-way valve mechanism which permits liquid to be pumped from the container to which the coupler is interconnected, but positively blocks the flow of liquid in the opposite direction toward the container reservoir.

17 Claims, 9 Drawing Sheets

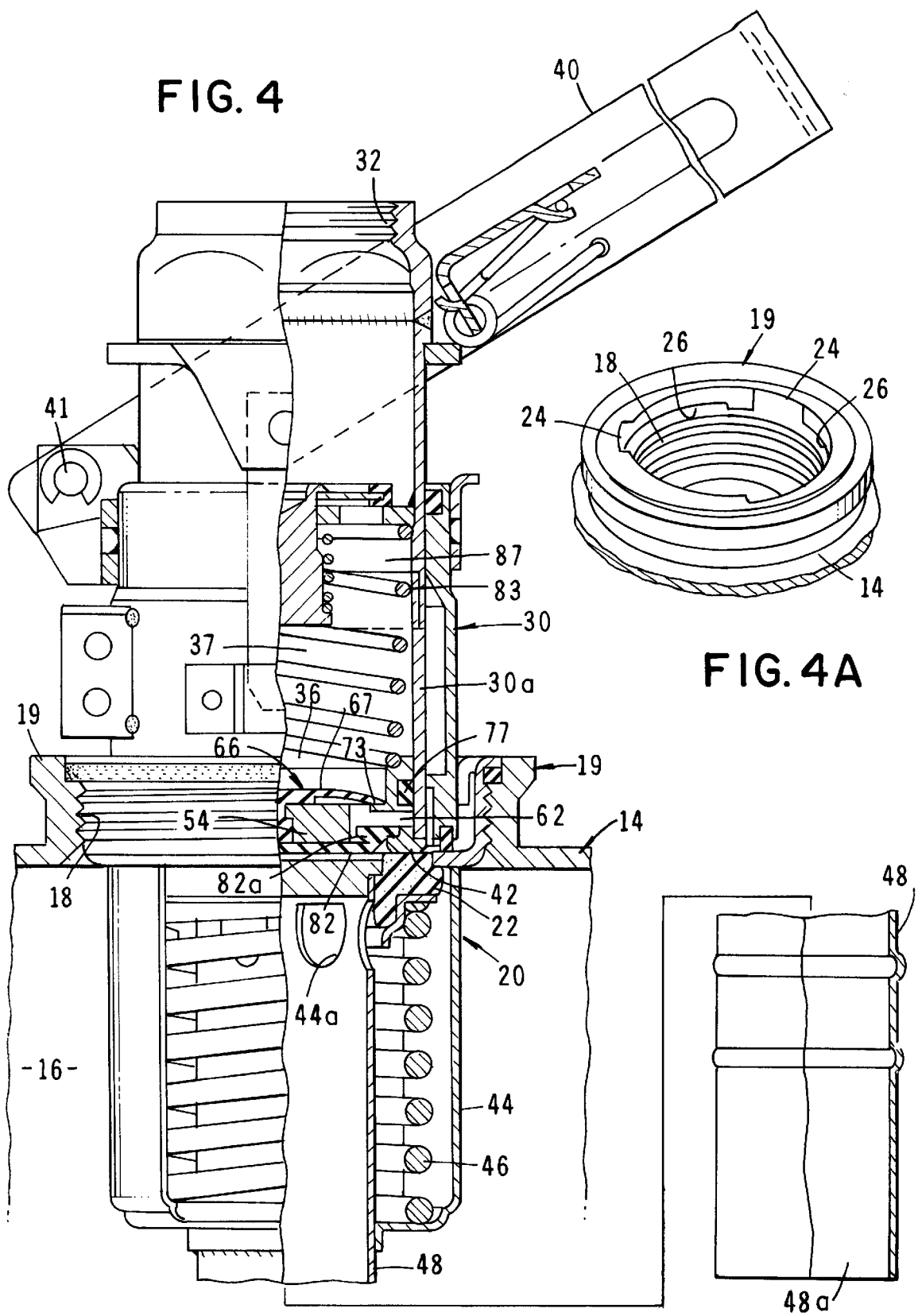
FIG. 4
FIG. 4A
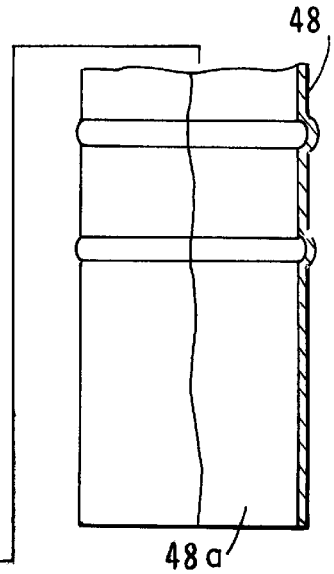

LIQUID TRANSFER SYSTEM WITH FLOW CONTROL

FIELD OF THE INVENTION

The present invention relates generally to systems for the filling, transport, and emptying of liquid containers. More particularly, the invention concerns a novel, coupler for interconnection with a coupler operated extractor valve provided on the liquid container which coupler includes flow control means for preventing liquid trapped within the coupler body from leaking back into a container with which the coupler is interconnected.

DISCUSSION OF THE PRIOR ART

A number of different types of reusable systems for the storage, shipment and transport of liquid formulations have been suggested. One of the most advanced of such systems was developed by and is presently commercially available from Micro Matic, Inc. of Northridge, Calif.

The Micro Matic system is basically a two-part system which comprises a coupler operated extractor valve which is interconnectable with a conventional drum via existing threaded connections and a cooperating coupler which is operably coupled with the extractor valve to allow drum emptying through the use of a separate pumping system. The extractor valve apparatus which can either remain with the drum after emptying, or can be removed for drum processing, includes a valve body and a down tube connected to the valve body which extends to the bottom of the drum to permit the complete transfer of liquid from the drum.

The Micro Matic system, while representing the best of the current state of the art liquid transfer systems, has certain drawbacks which are sought to be overcome by the system of the present invention. More particularly, the coupler component of the prior art Micro Matic system is of a design which permits a small amount of fluids being pumped from the container to remain trapped within the coupler body. Accordingly, when the coupler is connected with a fresh container and the extractor valve thereof is opened, the trapped fluid can undesirably flow into the container and contaminate the contents thereof. In most cases this feature does not present a major problem. However, when certain types of liquids are being transferred, even a small amount of contamination of the liquid within the fresh container is most undesirable. As will be better understood from the discussion which follows, the present inventor recognized the problem and overcame it by providing an elegant, but relatively simple modified coupler which positively prevents the backflow of liquids trapped within the coupler body thereby making the modified coupler safe to use in the transfer of even the most contamination sensitive types of liquids.

SUMMARY OF THE INVENTION

It is a object of the present invention to provide a system for the filling, transport and emptying of liquid containers which include a novel coupler mechanism for interconnection with a coupler operated extractor valve provided on the liquid container, which coupler includes novel coupler flow control means for preventing liquid trapped within the coupler body from leaking back into the container to which the coupler is connected.

Another object of the invention is to provide a system of the aforementioned character in which the coupler mechanism can be used with a number of different containers without the danger of contaminating the contents of the containers.

Another object of the invention is to provide a system as described in the preceding paragraphs in which the coupler includes a novel one-way valve mechanism which permits liquid to be pumped from the container to which the coupler is interconnected, but positively blocks the flow of liquid in the opposite direction toward the container reservoir.

Another object of the invention is to provide a system of the class described which is highly reliable in operation, is of a simple straight forward design and is quick and easy to use.

Another object of the invention is to provide a system of the character described in the preceding paragraphs which is inexpensive to produce and requires minimum maintenance.

BRIEF DESCRIPTION OF THE DRAWINGS

FIG. 4 is an enlarged, fragmentary, side-elevational view, partly in cross section of a portion of the liquid transfer apparatus of the present invention showing the valve in a closed, non-actuated configuration.

FIG. 4A is a generally perspective, fragmentary view of the connector neck portion of the container and a portion of the extractor valve assembly.

DESCRIPTION OF THE INVENTION

Figure 1:
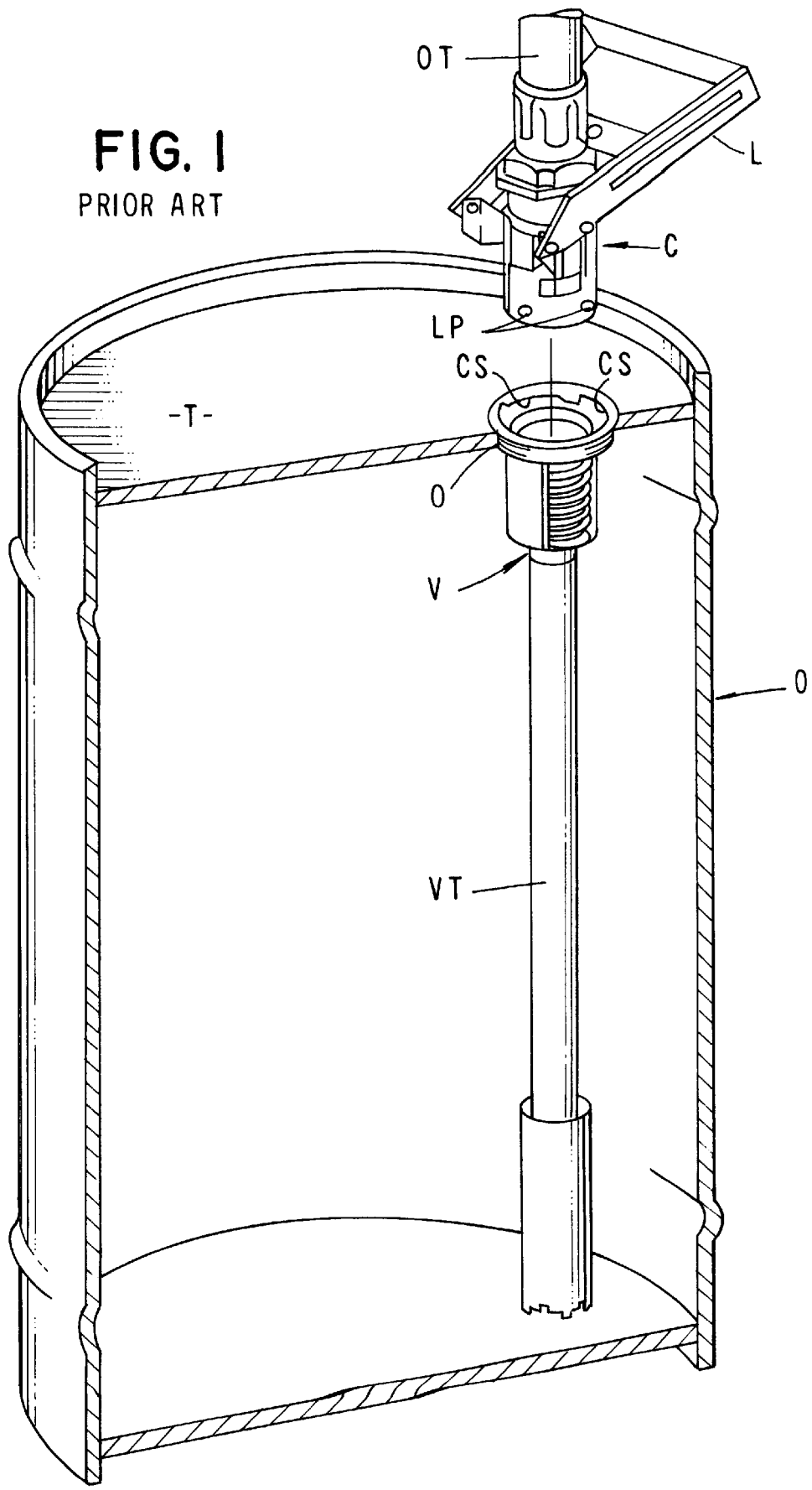
FIG. 1 is a generally perspective exploded view of a prior art liquid transfer system showing the fluid container drum broken away to reveal internal construction of the prior art extractor valve.

Referring to the drawings and particularly to FIGS. 1 through 4, a prior art fluid transfer system of the character manufactured and sold by Micro Matic U.S.A., Inc. of Northridge, California is there illustrated. This liquid transfer system comprises a fluid container or drum "D" of a conventional type having a threaded opening "O" provided in the top wall "T" of the container. In FIG. 1, the Micro Matic coupler operated extractor valve assembly "V" is shown threadably interconnected with drum "D" with the valve body thereof extending through opening "O". As indicated in FIG. 1, the extractor valve apparatus "V" includes a down tube "VT" which is connected to the valve body and extends downwardly to a location proximate the bottom of the drum to permit the complete extraction of liquids therefrom.

Referring to FIG. 1, it can be seen that, in the prior art Micro Matic liquid transfer system, the coupler assembly "C" is removably interconnected with the valve assembly "V" by means of a bayonet-like coupling system. More particularly, the opening, or connector port of the Micro Matic valve body is provided with a plurality of circumferentially spaced, machined or otherwise integrally formed, cam surfaces "CS" (FIG. 1) which are mateably engaged by a plurality of outwardly extending circumferentially spaced locking pins "LP" provided proximate the lower, cylindrically shaped portion of the coupler assembly "C".

In operation of the Micro Matic system, the coupler assembly "C" is interconnected with the valve mechanism by inserting the lower portion of the coupler mechanism into the connector port of the valve assembly then rotating the coupler so that the locking pins "LP" ride upwardly along the cam surfaces "CS" in a manner to urge the coupler into sealable interconnection with the valve mechanism in the manner shown in FIG. 4. When the coupler is interconnected with the valve mechanism, a liquid type seal is formed between the coupler mechanism "C" and the connector port of the valve body of the valve assembly "V". This type of coupler extractor valve interface is of a character well known to those skilled in the art and is fully described in technical publications available from Micro Matic U.S.A., Inc. of Northridge, Calif.

Figure 3:
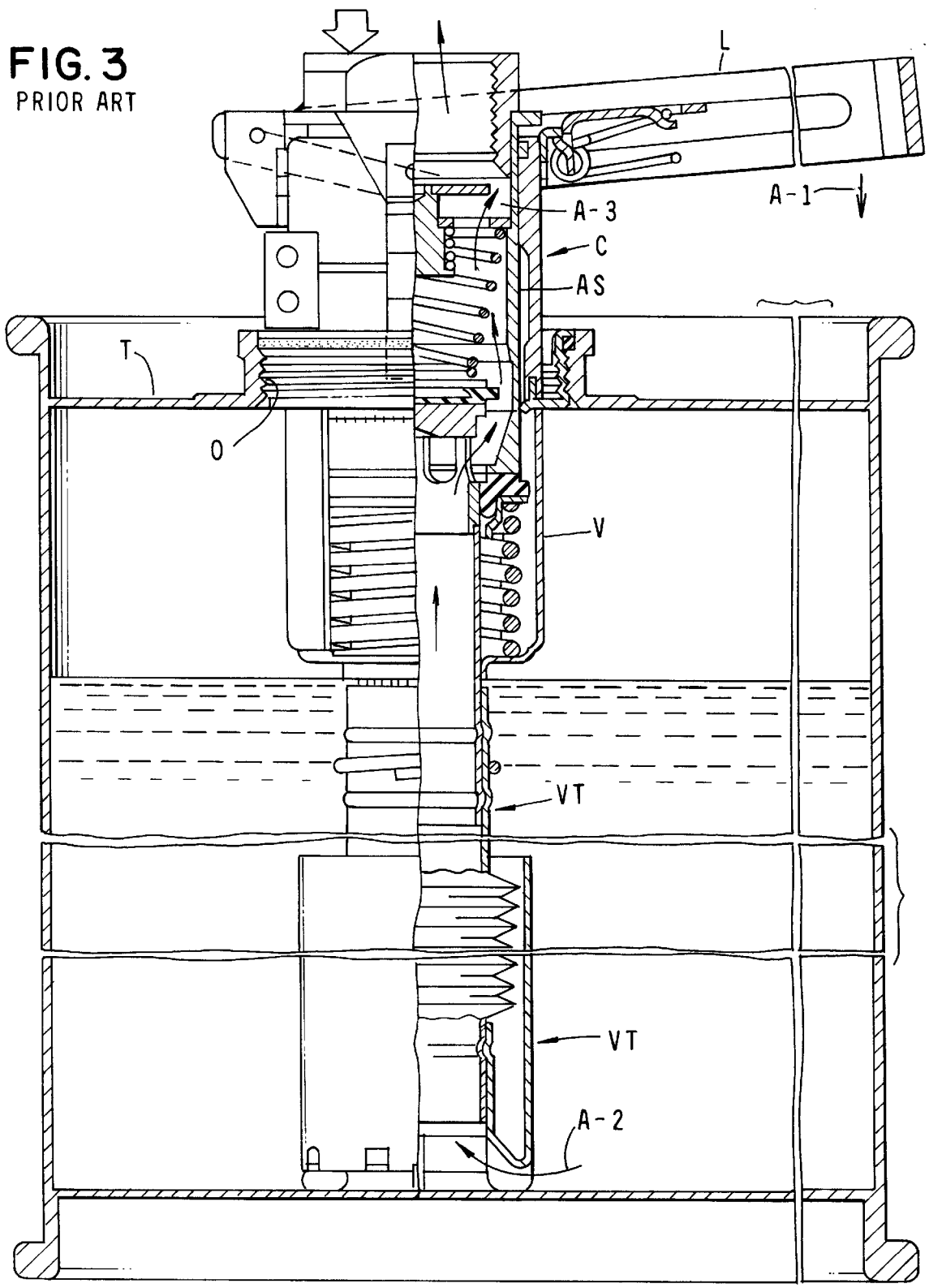
FIG. 3 is a side-elevational, cross-sectional view of the prior art device shown in FIG. 2, but shown in the configuration wherein the coupler mechanism is in a valve actuating configuration to permit liquid flow from the reservoir of the container through the extractor valve into the coupling mechanism and then outwardly through a liquid transfer line.

After the coupler assembly "C" of the Micro Matic system has been interconnected with the valve assembly "V" in the manner described in the preceding paragraphs, a downward pressure exerted on the operating lever "L" of the coupler mechanism in the direction of the arrow A-1 of FIG. 3 will cause the actuating sleeve, or probe "AS" of the coupler mechanism to move downwardly in the manner shown in FIG. 3 to open the normally closed valve thereby permitted fluid to flow from drum "D" through the down tube "DT" in the direction of the arrows A-2 of FIG. 3 and then outwardly of the coupler in the direction of the arrow A-3 toward an outlet tube "OT" (FIG. 1) which is appropriately interconnected with an externally located pumping system. Once again, the operation of the coupler mechanism and pumping system of the Micro Matic liquid transfer apparatus is well known to those skilled in the art and is fully described in Micro Matic U.S.A., Inc. technical publications.

Figure 2:
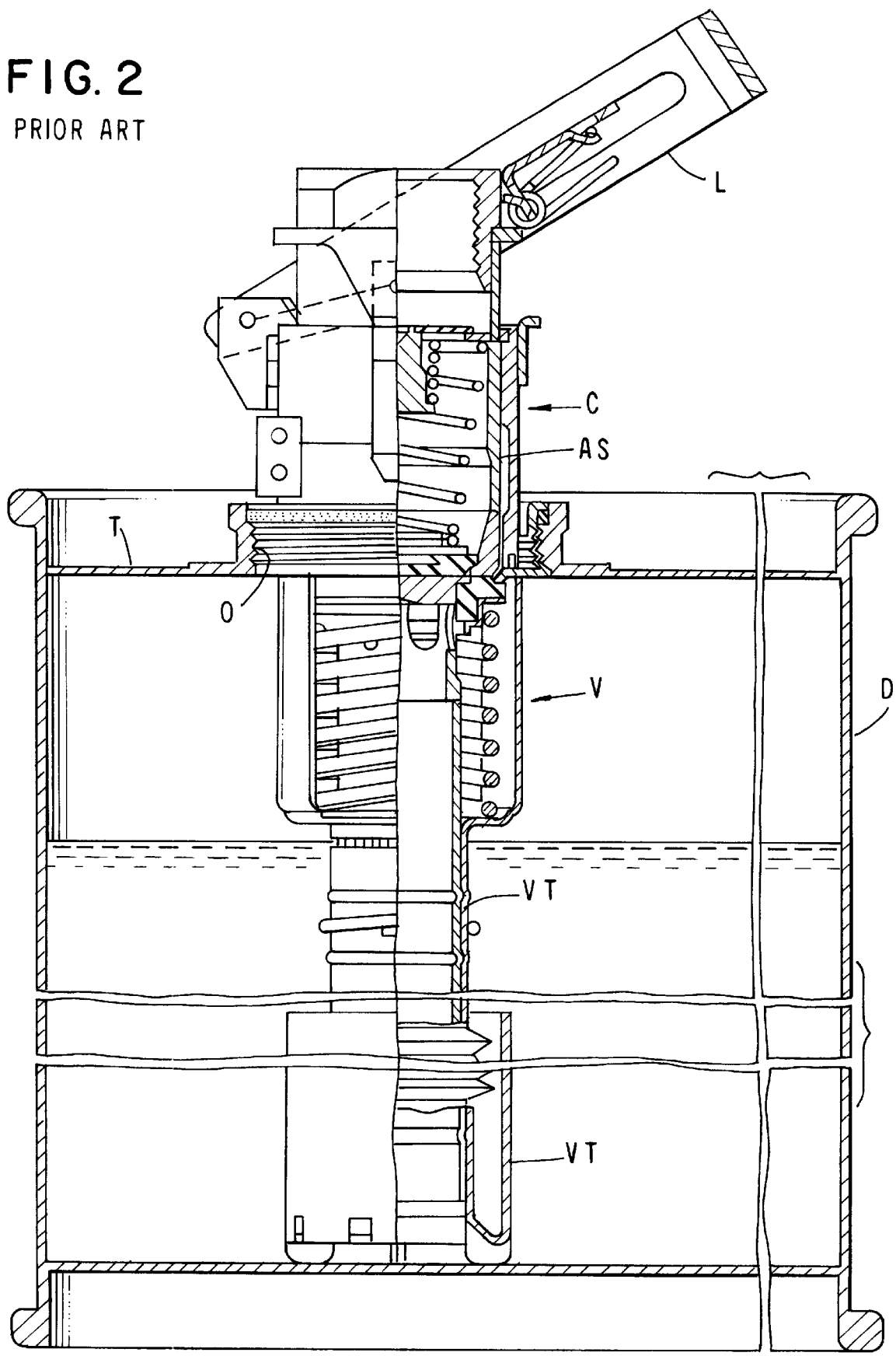
FIG. 2 is a foreshortened, side-elevational, cross-sectional view of the prior art liquid transfer system shown in FIG. 1 with the coupler mechanism of the apparatus connected to with the extractor valve mechanism, which, in turn, is interconnected with the liquid container.

Turning now to FIGS. 4 through 11 wherein the operating components of the improved liquid transfer system of the present invention are illustrated, it is to be noted that the improved system is of somewhat similar design to the prior art Micro Matic U.S.A., Inc. system illustrated in FIGS. 1 through 3 and operates in somewhat the same manner. More particularly, the improved liquid transfer system of the present invention comprises a container 14 of the character generally illustrated in FIG. 1 having an internal reservoir 16 for containing the liquid to be dispensed (FIG. 4). Container 14 includes a threaded access opening 18 provided in an upstanding collar or internally threaded neck 19 (FIG. 4A) for permitting access to internal liquid reservoir 16. An extractor valve assembly 20 is threadably interconnected with access opening 18 in the manner shown in FIG. 4 and includes an elastomeric valve member 22 which is movable by a coupler assembly from a closed position shown in FIG. 4 to an open position shown in FIG. 5 wherein fluid is permitted to flow through the valve assembly 20 and outwardly of container 14. As will be discussed in greater detail hereinafter, the coupler assembly of the invention is interconnected with and operates the extractor valve assembly in much the same manner as does the prior art Micro Matic coupler.

As shown in FIG. 4, the improved coupler assembly of the present invention is removably connected to the extractor valve assembly 20 so that a lower ring-like portion 42 of the coupler assembly sealably engages elastomeric gasket or member 22. Interconnection of the valve assembly with the extractor valve assembly is accomplished by inserting the outwardly extending pins "LP" (FIG. 1) of the coupler assembly into circumferentially spaced slots 24 formed in the upper portion of the neck of the extractor valve assembly (FIG. 4A). The coupler assembly is then rotated so that the locking pins slide along cam surfaces 26 formed in the neck portion of the extractor valve assembly thereby causing the ring-like portion 42 of the coupler valve assembly to move into secure sealing engagement with elastomeric member or gasket 22. With the improved coupler assembly thusly interconnected with the extractor valve assembly which has been previously interconnected with the liquid container 16, the liquid transfer process can be accomplished.

Figure 5:
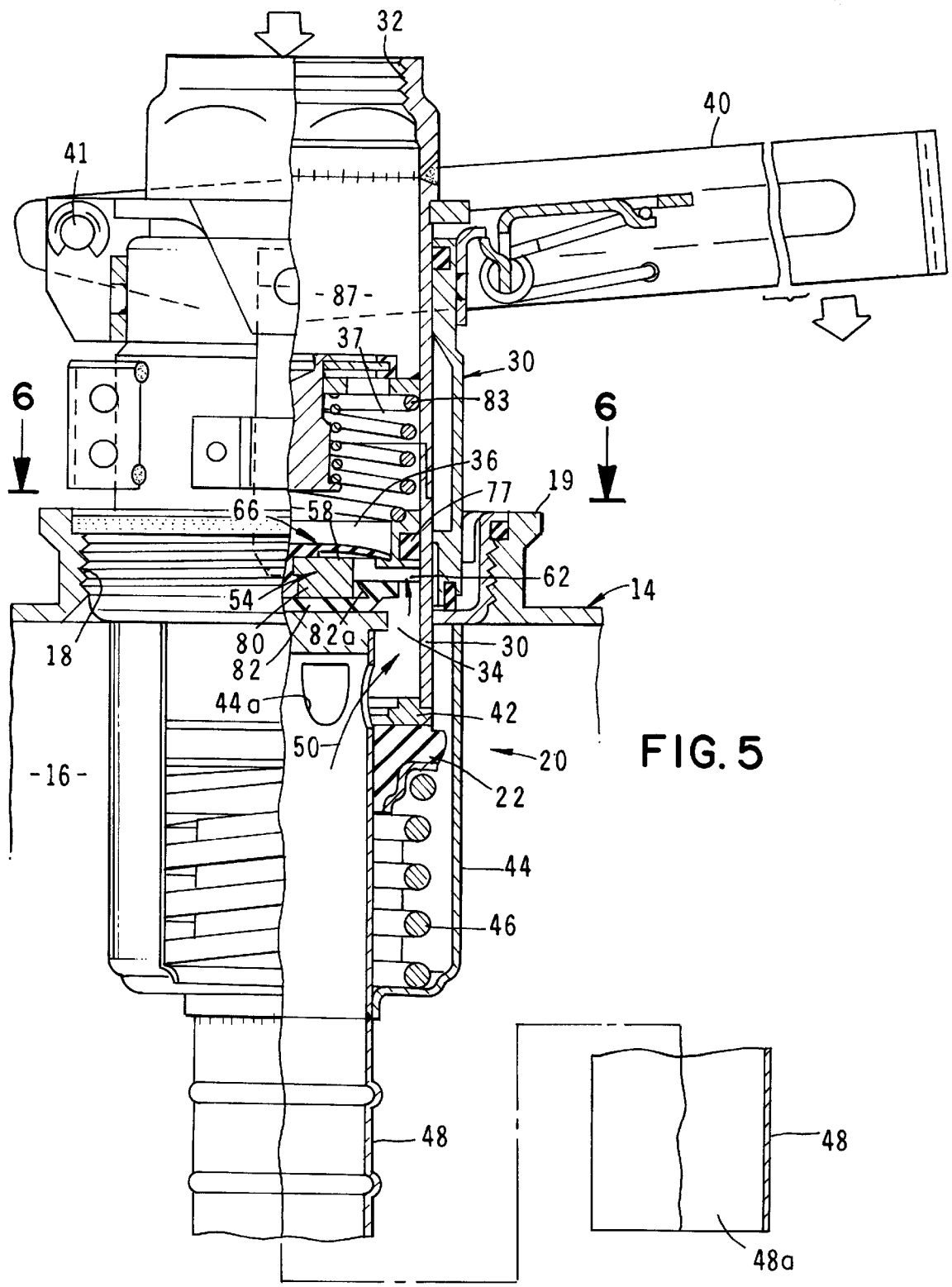
FIG. 5 is a side-elevational, cross-sectional view similar to FIG. 4, but showing the valve in an open configuration with liquid in the container flowing toward the coupler portion of the apparatus, but being momentarily blocked by the umbrella valve of the device.
Figure 6:
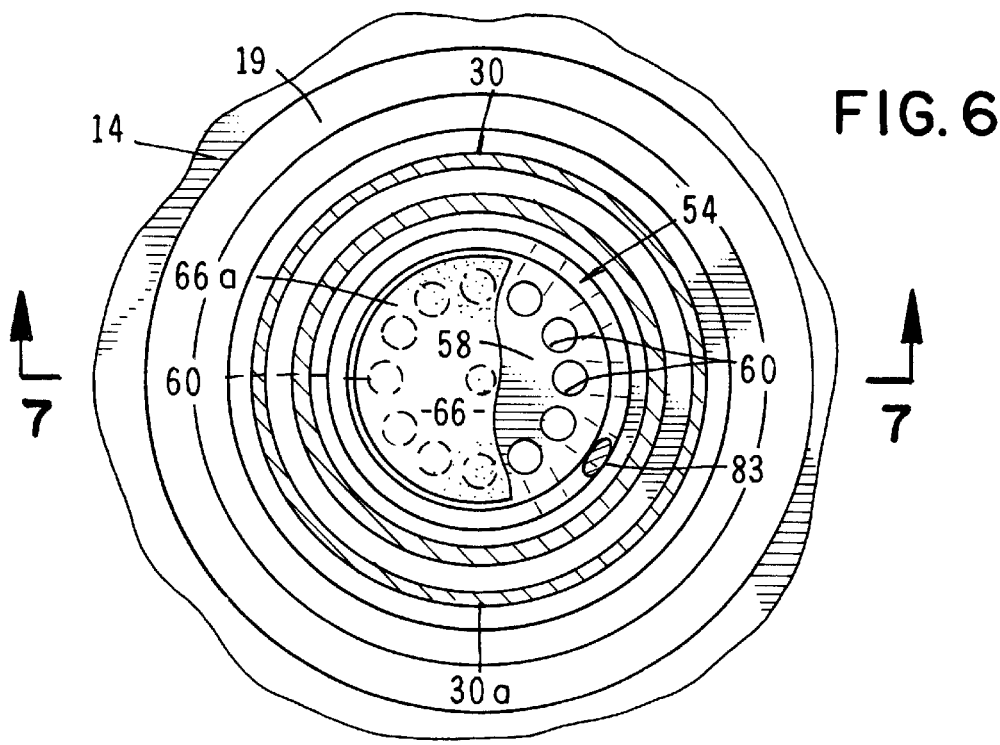
FIG. 6 is a view taken along lines 6—6 of FIG. 5.

As best seen in FIG. 4, the improved coupler assembly of the present form of the invention comprises a generally cylindrically shaped coupler body 30 having an outlet port 32. Telescopically movable within body 30 is a skirt-like actuator sleeve 30a which forms a part of the actuating means of the invention and which also defines the inlet port 34 of the coupler body (FIG. 5). The actuating means of the invention functions to move the elastomeric valve member 22 of the extractor valve assembly from the closed position shown in FIG. 4 to the open position shown in FIG. 5. In the form of the invention shown in the drawings, the actuating means comprises, in addition to sleeve-like member 30a an actuating handle 40 which is pivotally connected to the coupler body. Handle 40 is pivotally movable about a pivot pin 41 from the first upper position shown in FIG. 4 to the second actuating position shown in FIG. 5. More particularly, as actuating handle 40 is pivoted downwardly about pivot pin 41 in the direction of the arrow in FIG. 5, skirt-like member 30a, along with ring-like portion 42 which is connected thereto will be moved downwardly in a manner to cause ring-like portion 42 to engage valve member 22 move it downwardly within the generally cup-shaped upper portion 44 of the extractor valve assembly. As indicated in the drawings, biasing means here provided in the form of a coiled spring 46 resists downward movement of elastomeric member 22 and in a static condition continuously urges member 22 into the valve closed position shown in FIG. 4.

Figure 7:
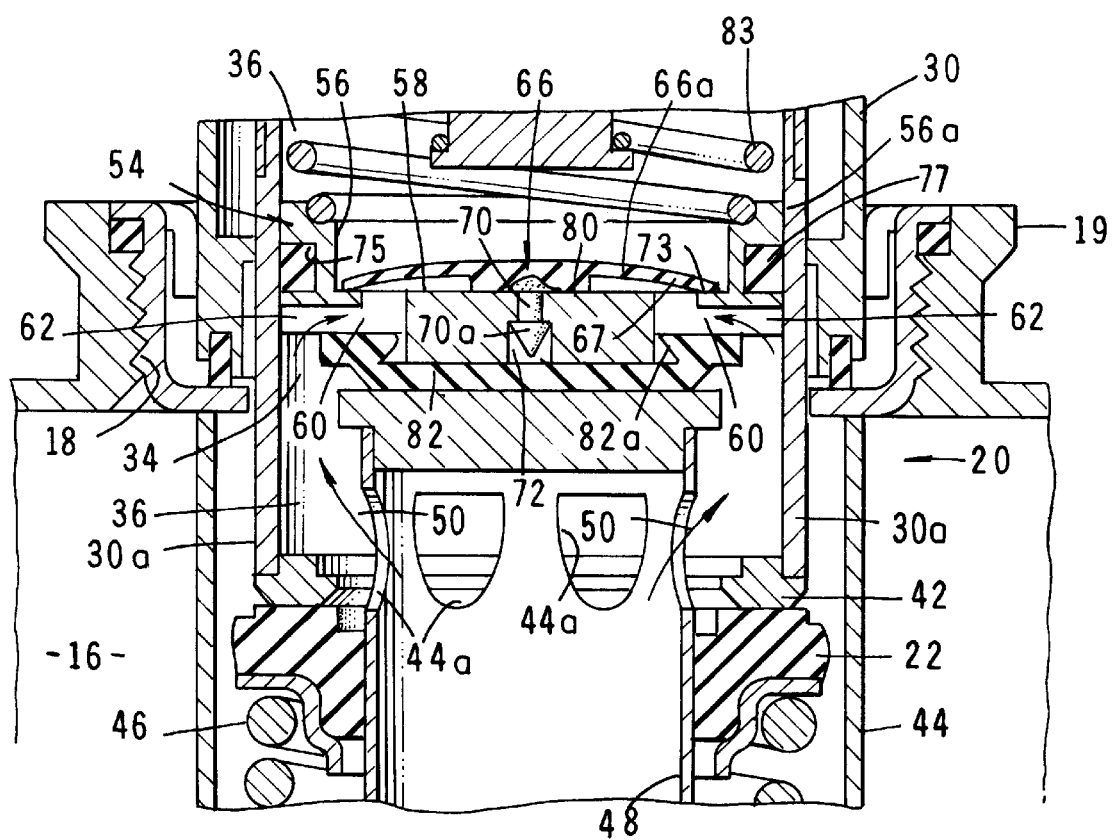
FIG. 7 is a view taken along lines 7—7 of FIG. 6.

When the extractor valve is in the open position shown in FIGS. 5 and 7, liquid contained within the liquid container is free to flow through the lower portion 48a of the downwardly extending downtube 48 which, as shown FIG. 1, extends downwardly proximate the bottom of the liquid container. As indicated in FIG. 5 liquid flowing through the downtube 48 will flow upwardly in the direction of the arrows 50 of FIGS. 5 and 7 and toward the inlet 34 of the coupler assembly.

Figure 8:
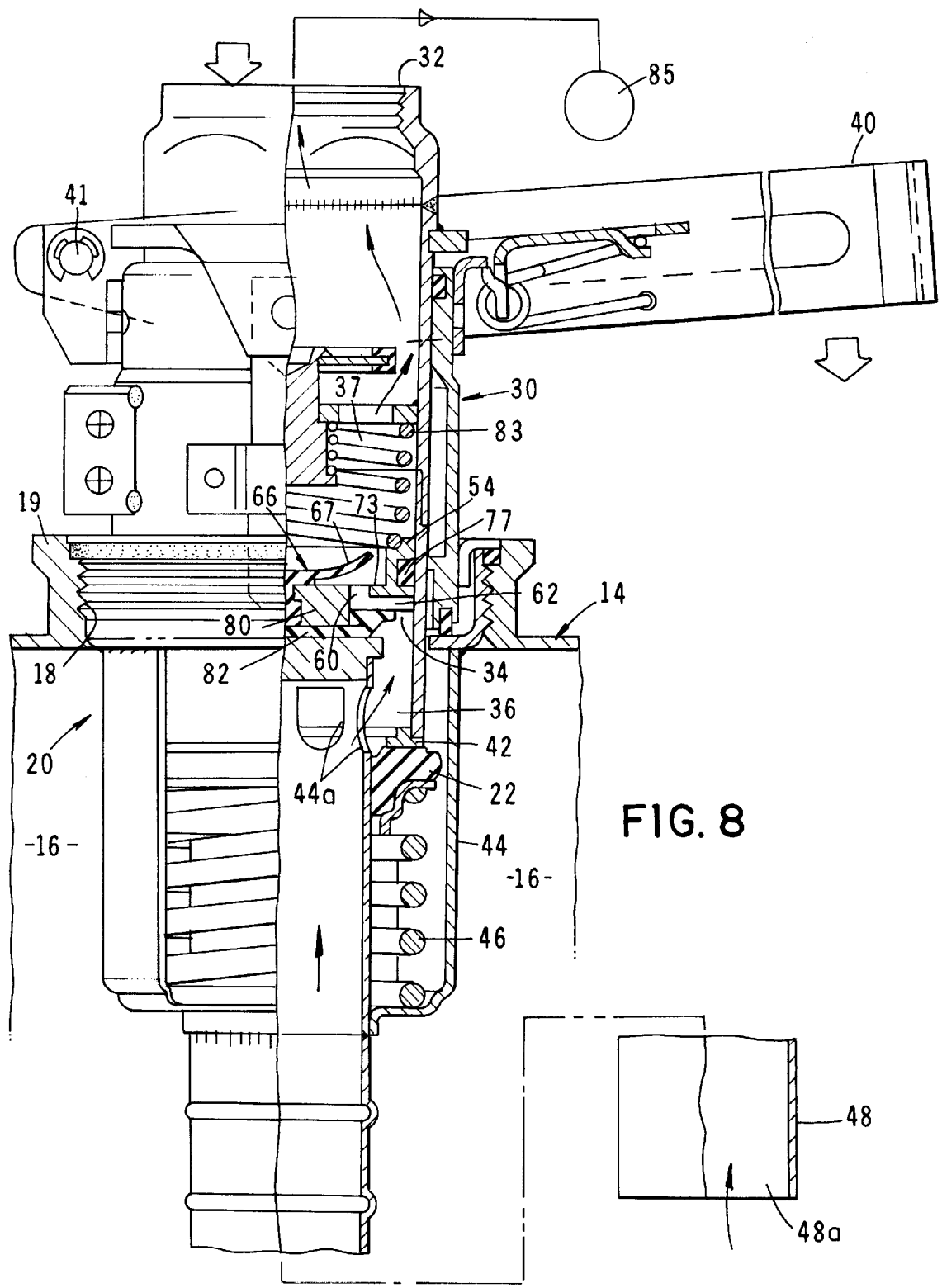
FIG. 8 is a side-elevational, cross-sectional view similar to FIG. 5, but showing the umbrella device in an open configuration to permit liquid flow outwardly of the device through the open coupler valve and the body of the coupler apparatus.

Forming an extremely important aspect of the improved coupler valve assembly of the present invention is valve coupler means which are disposed within a lower chamber 36 of actuating member sleeve 36*a*. This important coupler valve means functions to control liquid flow between lower chamber 36 of sleeve 30*a* and an upper chamber 37 of sleeve 30*a*. Referring to FIG. 10, this important coupler valve means of the invention can be seen to comprise a generally ring-shaped insert 54 which is sealably mounted within the lower chamber 36 of actuating sleeve or member 36*a* Ring-shaped insert 54 includes a downwardly depending skirt-like portion 56 which has an outer, circumferentially extending surface 56*a*. Provided internally of portion 56 is a base wall 58 which has a plurality of circumferentially spaced-apart flow apertures 60 formed therein. Base 58, in cooperation with the inner wall 56*b* of portion 56 defines an internal chamber into which fluid liquid can flow via inlet 34 of the coupler assembly. More particularly, as indicated in FIGS. 8 and 9, liquid flowing through inlet port 34 will flow through a plurality of circumferentially spaced liquid passageways 62 which are formed in skirt-like portion 56 of insert 54 and serve to interconnect inlet port 34 with internal chamber 64 of insert 54 which chamber is formed by base wall 58 and inner wall 56*b* of skirt-like portion 56.

Also forming an important part of the coupler valve means of the invention is a generally umbrella-shaped valve member 66 which is connected to insert 54. Valve member 66 comprises a yieldably deformable disk-like top wall 66*a* having a peripheral portion 67. A central stem 70 is integrally formed with the bottom surface of wall 66*a* and depends downwardly therefrom in a manner best seen in FIG. 10. Stem 70 terminates in a generally cone shaped end portion 70*a* which is lockably receivable within a centrally disposed counterbore 72 formed in the bottom wall 58 of insert 56 (FIGS. 7 and 9). Also formed in base wall 58 of the insert is a centrally disposed bore 74 which is of a slightly smaller diameter than the diameter of counterbore 72. With this construction, valve member 66, which is formed of a yieldably deformable elastomeric material, can be snapped into position within bore 74 and counterbore 72 so as to securely position valve 66 within chamber 64 of insert 54. Circumscribing apertures 60 is a valve seat 73 (FIG. 5) which is sealably engageable by the peripheral portion 67 of umbrella valve 66 when the valve is in the closed position shown in FIG. 7.

Figure 9:
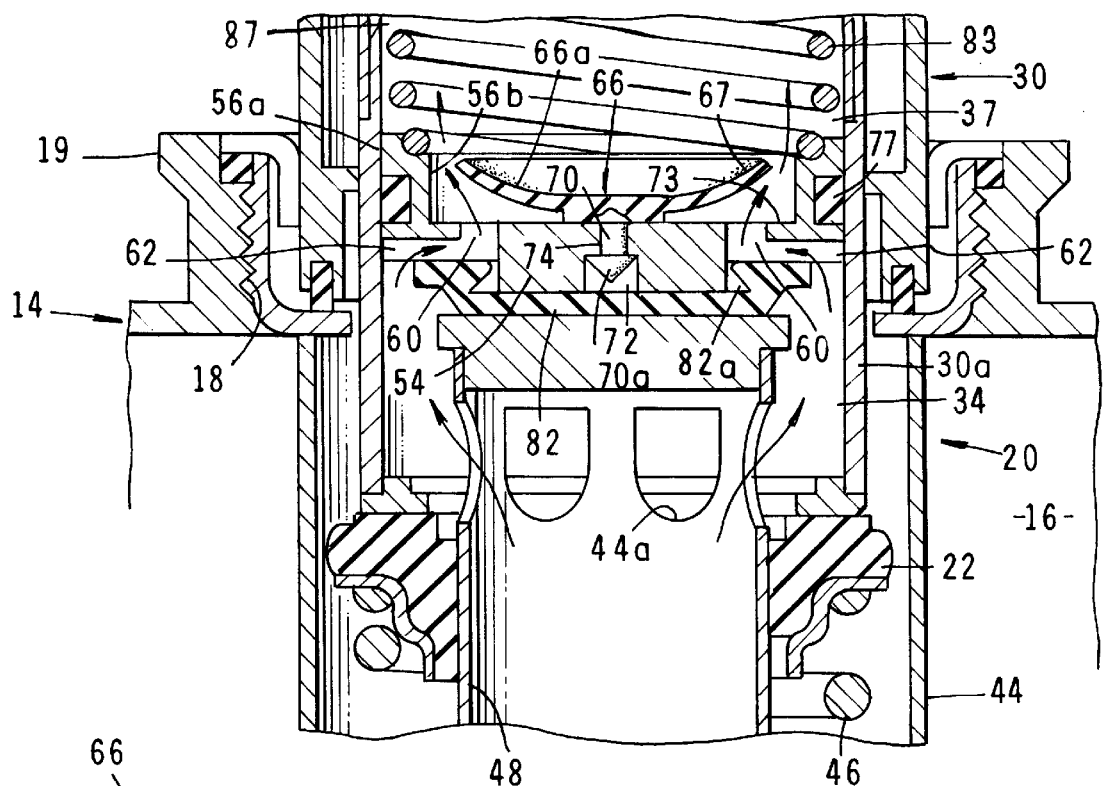
FIG. 9 is an enlarged, fragmentary, cross-sectional view similar to FIG. 8 further illustrating the flow of fluid outwardly of the device.
Figure 10:
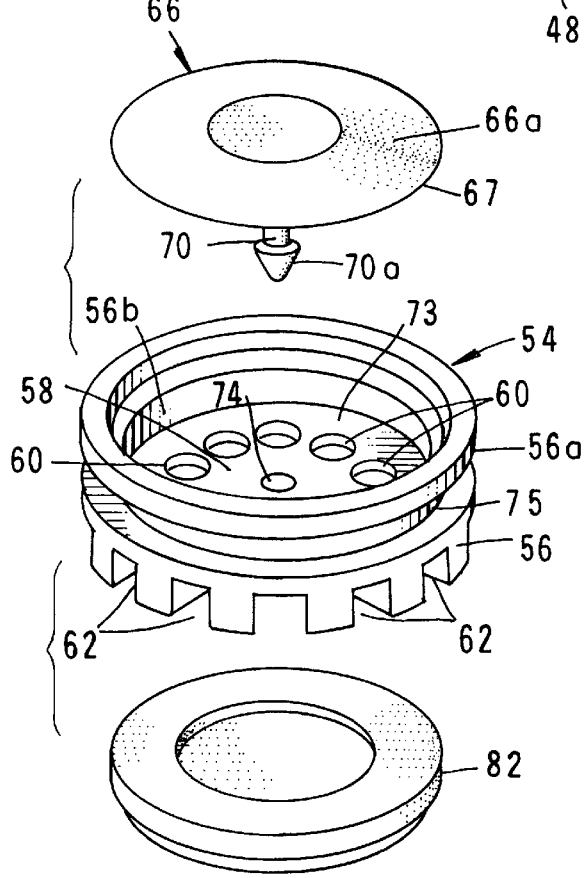
FIG. 10 is a generally perspective, exploded view of the form of the coupler valving mechanism of the apparatus of the invention.
Figure 11:
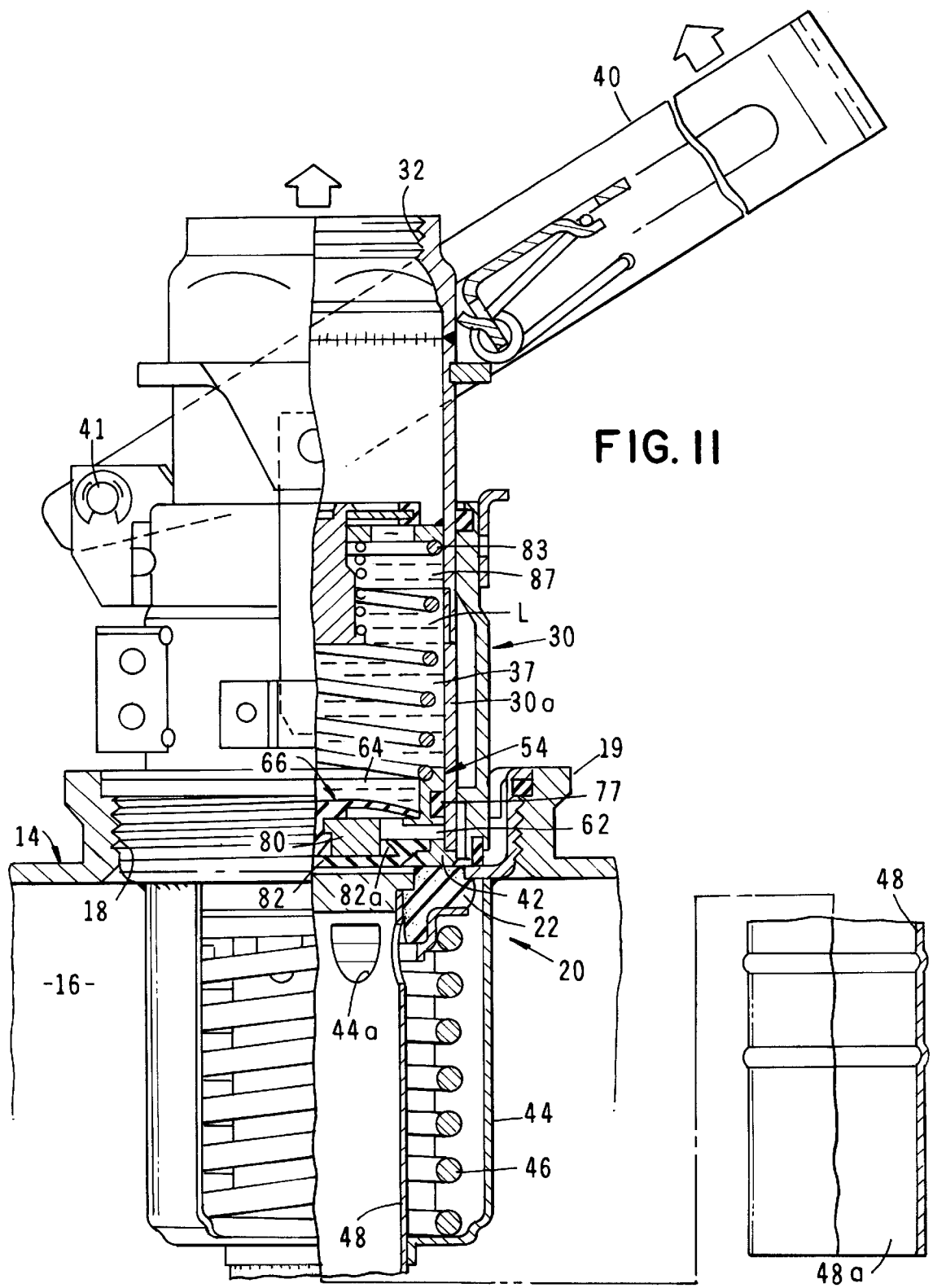
FIG. 11 is a side-elevational, cross-sectional view similar to FIG. 5, but showing the portion of the components of the apparatus as they appear in a static, non-pumping configuration.

As best seen by referring to FIGS. 7 and 10, the outer surface 56*a* of skirt-like portion 56 of the insert is provided with a circumferentially extending groove 75 which is adapted to receive an elastomeric O-ring 77 which sealably engages the inner surface of actuating sleeve 30 in the manner best seen in FIGS. 7 and 9.

As shown in FIG. 7, the bottom of base wall 58 includes a central, downwardly extending, hub-like portion 80 which is closely received within a central cavity 82*a* of a dry seal closure member 82 (FIG. 7). Seal 82 is preferably constructed of a yieldably deformable elastomeric material such as a fluoroelastomer material manufactured and sold by duPont under the name and style "Viton". Seal 82 comprises a part of the sealing means of the invention and cooperates with the actuating means to close the lower portion of the coupler body. More particularly, as best seen in FIG. 4, when the extractor valve assembly is in the valve-closed position, the peripheral portion of dry seal member 82 sealably engages the ring-like portion 42 of the actuating means. As also shown in FIG. 4, a second biasing means shown here as a coil spring 83 is provided for yieldably urging insert 54 in a downward direction so that the peripheral portion of sealing member 82 is continuously urged into sealing engagement with ring-like portion 42. When the components of the apparatus are in the position shown in FIG. 4, it is apparent that liquid cannot flow from reservoir 16 of the container into the coupler valve assembly. However, when the components are moved by the actuating means into the position shown in FIGS. 5 and 7 and elastomeric member 22 is moved away from dry seal member 82, liquid is free to flow inwardly of the coupler assembly via liquid inlet 34 and passageways 62 and apertures 60 of insert 54 where it will impinge on umbrella valve 66.

In using the apparatus of the invention, with the improved coupler assembly interconnected with the extractor valve assembly in the manner shown in FIG. 4, downward force exerted on handle 40 in the manner shown by the arrow in FIG. 5 will cause seal 22 of the extractor valve assembly to be moved downwardly into the valve open configuration shown in FIG. 5. As indicated in FIG. 8, when the pump means of the invention for pumping fluid from the container, which is here shown as a conventional pump 85, is energized, fluid will flow from the reservoir of the container into the bottom opening 48*a* of the downtube 48, upwardly through the downtube and outwardly thereof through a plurality of circumferentially spaced outlets 44*a* formed in cup-like member 44. Next, the liquid will be drawn through inlet 34 and into radial passageways 62 of insert 54. Liquid will next flow through flow apertures 60 provided in base wall 58 of insert 54 where it will impinge upon the peripheral portion 67 of umbrella valve member 66. In response to this flow, of liquid under pressure, the peripheral portion of the umbrella valve member will deform from the closed position shown in FIGS. 4, 5, and 7 into the open position shown in FIGS. 8 and 9. As the umbrella valve moves into this open position, liquid will be free to flow into internal chamber 64 of insert 54, past umbrella valve 66 and into chamber 36*a* of central passageway 87 of coupler body 30. Continued pumping action by pump 85 will cause the liquid to flow outwardly of the outlet of the coupler body where it can be transferred to a remote location via an outlet tube such as outlet tube "OT" shown in FIG. 1.

So long as pump 85 is operating, fluid will continue to flow outwardly of the apparatus in the direction of the arrow shown in FIG. 8. However, when the pumping action is stopped, liquid flow through apertures 60 of insert 54 stops, and the yieldably deformable peripheral portion 67 of umbrella valve 66 will once again return to the valve closed position shown in FIG. 11. It is apparent that when the umbrella valve moves into the closed position, liquid remaining within chamber 36*a* and the upper portion 87 of the coupler body will be trapped therewithin. This liquid will remain trapped within the upper portion of the coupler body by the closed umbrella valve 66 even when handle 40 is moved into the upraised position shown in FIG. 11 and the coupler assembly is disengaged from the extractor tube valve assembly by counter-rotation of the coupler valve assembly relative thereto. Further, and most importantly, with this novel construction, when the coupler valve assembly is interconnected with a fresh, untapped container 14, the closed umbrella valve 66 will positively prevent the liquid "L" which is trapped within portion 87 (FIG. 11) from flowing into the freshly tapped container. In this way contamination of the fresh contents of the new container is uniquely prevented. With the construction thus described, it is apparent that the trapped liquid "L" which is trapped within the coupler assembly will never flow into the fresh container and contaminate the contents thereof since, upon energizing pump 85, the trapped liquid "L" will be drawn out of chamber 87 and into the delivery line or outlet tube which is interconnected with the coupler assembly.

Having now described the invention in detail in accordance with the requirements of the patent statutes, those skilled in this art will have no difficulty in making changes and modifications to the individual parts or their relative assembly in order to meet specific requirement or conditions. Such changes and modifications may be made without departing from the scope and spirit of the invention, as set forth in the following claims.

I claim:

1. In a liquid transfer system that includes a liquid container having a reservoir, an access opening to the reservoir and an extractor valve assembly connected to the access opening, which the extractor valve assembly includes a valve member movable from a closed position blocking liquid flow through the extractor valve assembly to an open position permitting liquid flow therethrough the improvement comprising a coupler assembly removably interconnectable with the extractor valve assembly, said coupler assembly comprising;
    (a) a coupler body having an inlet port and an outlet port;
    (b) actuating means operably associated with said coupler body for moving the valve member of the extractor valve assembly to an open position, said actuating means comprising an actuating member movable within said coupler body, said actuating member having an upper chamber and a lower chamber, said actuating means further including an actuating handle pivotally connected to said coupler body for moving said actuating member within said coupler body;
    (c) coupler valve means disposed within said lower chamber of said actuating member for controlling liquid flow between said upper and lower chambers thereof, said coupler valve means comprising;
        (i) an insert sealably and slidably mounted within said lower chamber of said actuating member, said insert having an internal chamber, at least one liquid passageway interconnecting said inlet port of said coupler body with said internal chamber and a valve seat;
        (ii) a valve member connected to said insert, said valve member being movable from a first position in sealing engagement with said valve seat to a second, open position in response to liquid flowing through said liquid passageway so as to permit liquid flow toward said outlet port of said coupler body, said valve member blocking liquid flow toward said inlet port of said coupler body when said valve member is in said first position.

2. In a liquid transfer system as defined in claim 1 in which said insert of said coupler valve means is generally ring shaped and includes a base wall and a downwardly depending skirt portion.

3. In a liquid transfer system as defined in claim 2 in which said base wall of said insert includes a peripheral surface defining said valve seat.

4. In a liquid transfer system as defined in claim 2 in which said skirt portion of said insert is provided with liquid passageways and includes an outer surface, said outer surface having a circumferentially extending groove.

5. In a liquid transfer system, as defined in claim 4, in which said coupler valve means further includes an elastomeric O-ring disposed within said circumferentially extending groove of said outer surface of said skirt portion for sealable engagement with actuating member.

6. In a liquid transfer system that includes a liquid container having a reservoir and an access opening to the reservoir, and further includes an extractor valve assembly connected to the liquid container proximate the access opening, the extractor valve assembly including a valve member movable from a closed position blocking liquid flow through the extractor valve assembly to an open position permitting liquid flow therethrough; the improvement comprising a coupler assembly removably coupled with the extractor valve assembly, said coupler assembly comprising:
    (a) a generally cylindrically shaped coupler body having an upper outlet port;
    (b) actuating means interconnected with said coupler body for moving the valve member of the extractor valve assembly from a closed position to an open position, said actuating means comprising:
    (i) an actuating sleeve slidably movable within said coupler body, said actuating sleeve having an upper chamber and a lower chamber having an inlet in communication with the reservoir of the liquid container; and
        (ii) an actuating handle pivotally connected to said coupler body and associated with said actuating member for moving said actuating member from a first upper position to a second lower position;
    (c) coupler valve means scalably disposed within said lower chamber of said actuating sleeve for controlling liquid flow between said upper and lower chambers thereof, said coupler valve means comprising;
        a generally ring shaped insert sealably and slidably mounted within said lower chamber of said actuating member, said insert comprising;
            a. a skirt having a plurality of circumferentially spaced, liquid passageways communicating with said inlet port of said lower chamber of said actuating sleeve;
            b. a base wall connected to said skirt portion and defining in cooperation therewith an internal chamber, said base wall having a peripheral surface defining a valve seat; and
        (ii) a valve member connected to said insert, said valve member being movable in response to liquid flowing from a first position in sealing engagement with said valve seat to a second, open position permitting liquid flow toward said outlet portion of said coupler body, said valve member blocking liquid flow toward said inlet of said lower chamber of said actuating sleeve when said valve member is in said first position.

7. In a liquid transfer system as defined in claim 6 in which said base wall of said insert is provided with a central aperture and in which said valve member comprises:
    (a) a generally disk shaped valve member having a yieldably deformable wall which includes a peripheral portion adapted to sealably engage said valve seat; and
    (b) a central stem connect ed to said wall and depending therefrom, said central stem having a lower extremity lockably receivable within said central aperture of said base wall.

8. In a liquid transfer system as defined in claim 6 in which said skirt portion of said insert includes an outer surface, said outer surface having a circumferentially extending groove and in which said coupler valve means further includes an elastomeric O-ring disposed within said groove for sealing engagement with said actuating sleeve of said actuating means.

9. In a liquid transfer system as defined in claim 6 further including sealing means for closing said inlet of said lower chamber of said actuating sleeve, said sealing means comprising a dry break seal.

10. In a liquid transfer system as defined in claim 9 further including biasing means disposed within said coupler body for urging said generally ring shaped insert toward said dry break seal.

11. A liquid transferring stem comprising:

(a) a liquid container leaving a liquid reservoir and an access opening communicating with said liquid reservoir;

(b) an extractor valve assembly connected to liquid container proximate said access opening, said extractor valve assembly including a valve member movable from a closed position blocking liquid flow through the extractor valve assembly to an open position permitting liquid flow therethrough;

(c) a coupler assembly removably connected to said extractor valve assembly, said coupler assembly comprising;

(i) a generally cylindrically shaped coupler body having an upper outlet port;

(ii) actuating means interconnected with said coupler body for moving the valve member of the extractor valve assembly from a closed position to an open position, said actuating means comprising:

a. an actuating sleeve telescopically movable within said coupler body, said actuating sleeve having an upper chamber and a lower chamber said lower chamber having an inlet in communication with said liquid reservoir of said liquid container;

b. an actuating handle pivotally connected to said coupler body for moving said actuating sleeve from a first upper location to a second lower location; and (iii) coupler valve means disposed within said lower chamber of said actuating sleeve for controlling liquid flow between said upper and lower chambers thereof, said coupler valve means comprising:

a. a generally ring shaped insert sealably and slidably mounted within said lower chamber of said actuating member, said insert comprising a skirt-like portion, an apertured base wall connected to said skirt-like portion and defining in cooperation therewith an internal chamber, said base wall defining a valve seat, said skirt-like portion and said base wall being provided with a plurality of liquid passageways interconnecting said internal chamber with said inlet of said lower chamber of said actuating sleeve; and b. a valve member connected to said insert, a peripheral portion of said valve member being movable in response to liquid flowing through said liquid passageways, said peripheral portion of said valve member being movable from a first position in sealing engagement with said valve seat to a second, open position permitting liquid flow toward said upper outlet port of said coupler body, said valve member blocking liquid flow toward said inlet of said lower chamber of said actuating sleeve body when said valve member is in said first position.

12. A liquid transfer system as defined in claim 11 in which said base wall of said insert includes peripheral surface defining said valve seat.

13. A liquid transfer system as defined in claim 11 in which said base wall of said insert is provided with a central aperture and in which said valve member comprises:

(a) a yieldably deformable top wall having a peripheral portion adapted to sealably engage said valve seat; and (b) a central stem connected to said top wall and depending therefrom, said central stem having a lower extremity receivable within said central aperture of said base wall.

14. In a liquid transfer system as defined in claim 13 in which said skirt portion of said insert includes an outer surface, said outer surface having a circumferentially extending groove and in which said coupler valve means further includes an elastomeric O-ring disposed within said groove for sealable engagement with said actuating sleeve of said actuating means.

15. In a liquid transfer system as defined in claim 14 in which said coupler valve means further includes sealing means connected to said insert for cooperation with said actuating means to close said inlet of said lower chamber of said actuating sleeve, said sealing means comprising a dry break seal.

16. In a liquid transfer system as defined in claim 15 further including biasing means disposed within said coupler body for urging said generally ring shaped insert into engagement with said dry break seal.

17. In a liquid transfer system as defined in claim 16 in which said biasing means comprises a coil spring disposed within said coupler body.

* * * * *